United States Patent [19]
Wake et al.

[11] 3,857,079
[45] Dec. 24, 1974

[54] MACHINE TOOL UTILIZING A POTENTIOMETER FOR DETERMINING VARIOUS POSITIONS

[75] Inventors: John A. Wake, Auburn; Arthur F. St. Andre, Marlboro, both of Mass.

[73] Assignee: Cincinnati Milacron-Heald Corp., Worcester, Mass.

[22] Filed: Mar. 9, 1973

[21] Appl. No.: 339,705

[52] U.S. Cl............... 318/663, 318/571, 318/436, 318/626, 318/467
[51] Int. Cl. .......................................... G05b 1/06
[58] Field of Search ........... 318/663, 665, 571, 436, 318/467, 626

[56] References Cited
UNITED STATES PATENTS

| | | | |
|---|---|---|---|
| 3,013,195 | 12/1961 | Langham | 318/663 X |
| 3,254,283 | 5/1966 | Hunt | 318/663 |
| 3,467,900 | 9/1969 | Benton | 318/663 X |
| 3,470,431 | 9/1969 | Jones | 318/663 |
| 3,755,726 | 8/1973 | Knipe | 318/663 X |

*Primary Examiner*—B. Dobeck
*Attorney, Agent, or Firm*—Norman S. Blodgett; Gerry A. Blodgett

[57] ABSTRACT

Machine tool in which movement of the table over the base is produced by a torque-controlled motor and in which the table positions are determined by means of a potentiometer and of preset resistance. At a predetermined position, a stop element on the base engages a stop element on the table. During the engagement of these stop elements, the torque generated by the motor remains at a preselected value.

8 Claims, 18 Drawing Figures

CYCLE DIAGRAM

3,857,079

MACHINE TOOL UTILIZING A POTENTIOMETER FOR DETERMINING VARIOUS POSITIONS

BACKGROUND OF THE INVENTION

In the design of a machine tool the regulation of the traverse motion, i.e., the motion of the tool in and out of the work in its axial direction, is very important. Not only is the rate of traverse feed important, but also the point at which transition from one feed rate to another takes place is also very important. This is important in order to obtain accuracy of work and quality of finish on the finished surface. In the past, the motion of a machine tool table has been brought about mostly by use of a hydraulic cylinder. The transition points and the rate of feed has been regulated by the use of valves. Since these valves represent the restriction of flow of hydraulic fluid under pressure, they generate considerable heat and this heat is carried throughout the entire hydraulic system, including the large traverse cylinder which lies deep within the body of the machine tool. The result is that, as the temperature of the working fluid changes during the working day, the thermal expansion and contraction of the machine tool structure introduces errors. In addition, although the use of hydraulic actuation is tempting because of its initial simplicity, the hydraulic system becomes very intricate when the machine tool traverse-motion cycle becomes complex. This means that the machine tool becomes covered with hydraulic lines and large hydraulic valves and solenoids. Furthermore, the hydraulic system is slow in response to control signals and, therefore, introduces substantial control lag into the system. These and other difficulties experienced with the prior art devices have been obviated in a novel manner by the present invention.

It is, therefore, an outstanding object of the invention to provide a machine tool whose traverse motion is brought about entirely by the use of an electrical actuator and electrical controls.

Another object of this invention is the provision of a machine tool which is free of hydraulic lines and valves.

A further object of the present invention is the provision of a machine tool in which the traverse motion takes place substantially without the generation of heat, so that the thermal expansion and contraction of the machine tool elements is reduced to a minimum.

It is another object of the instant invention to provide a machine tool in which a substantial portion of the controls are in the forms of transitorized intergrated circuit logic controls, so that the controls are not only rugged, but take up little space and are easily replaceable on a unit basis.

With these and other objects in view, as will be apparent to those skilled in the art, the invention resides in the combination of parts set forth in the specification and covered by the claims appended hereto.

SUMMARY OF THE INVENTION

In general, the invention consists of a machine tool having a base with a table mounted for sliding movement on the base. An actuator is operated between the base and the table and the torque and speed of the actuator are controllable. A primary potentiometer is connected to the actuator and a plurality of secondary potentiometers are set at selected values. A control is provided for comparing signals from the secondary potentiometers with a signal from the primary potentiometer. A stop element on the base engages a stop element on the table at a point in the sliding movement. A switch is mounted in front of one of the stop elements and is actuated by the other stop element. The torque generated by the actuator remains at a preselected value during contact between the stop elements.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
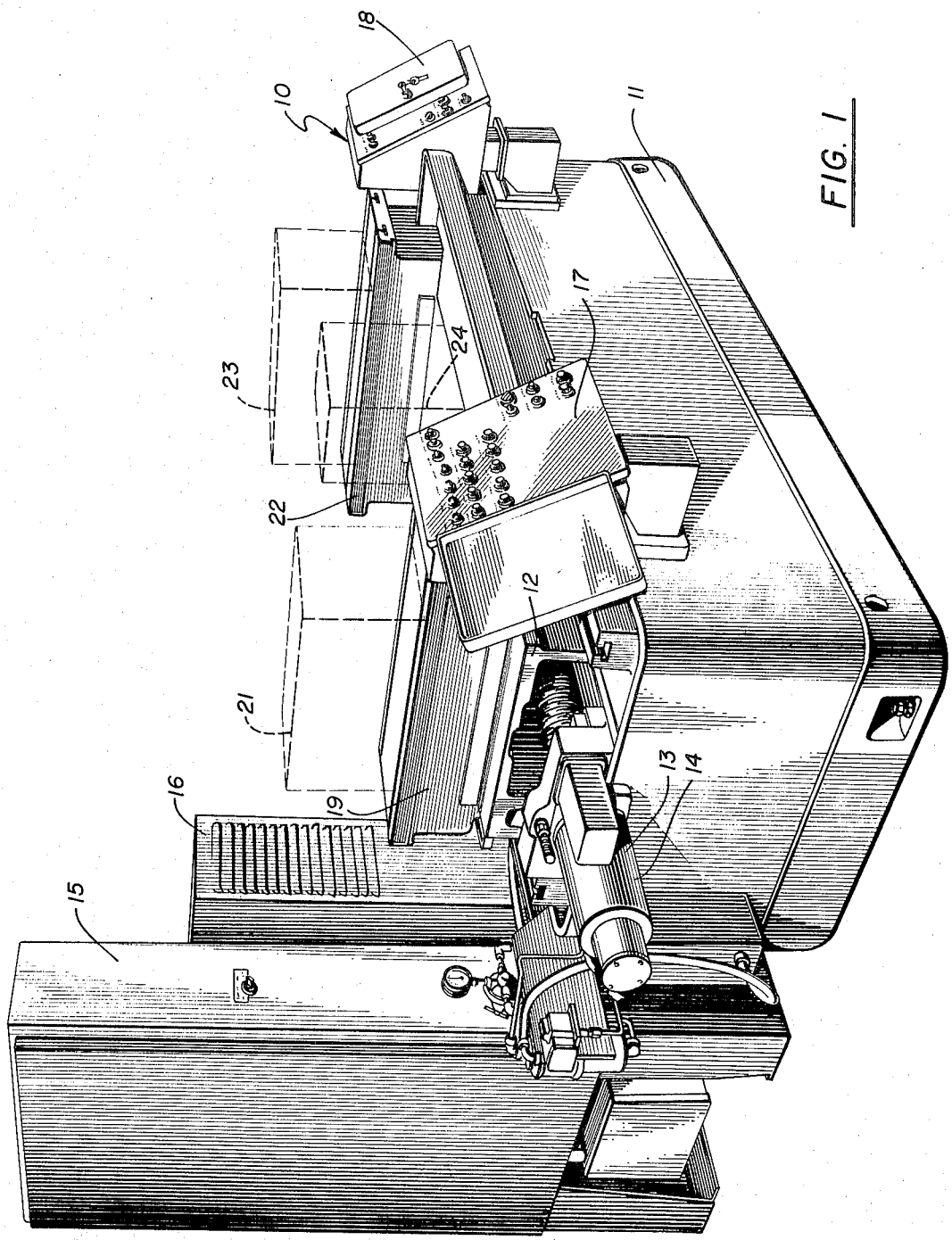
FIG. 1 is a perspective view of a machine tool embodying the principles of the present invention.

Referring first to FIG. 1, wherein are best shown the general features of the invention, the machine tool, indicated generally by the reference number 10, is shown as being in the form of a double-ended boring machine, having a base 11, on which a table 12 is mounted for sliding movement. An actuator 13, including a motor 14, is operative between the base and the table. The torque and speed of the motor 14 is controllable by apparatus located in a control cabinet 15. A control cabinet 16 contains the boring head speed control. Located at the front of the base 11 are control panels 17 and 18, which are substantially the same, but are at opposite ends of the base for the convenience of the operator. Mounted on the base 11, overlying the table 12 at the end of the base adjacent the control panel 17 is a bridge 19 on which is mounted a toolhead 21. At the other end of the base is a bridge 22 adapted to carry another toolhead 23. The toolheads 21 and 23 are of the conventional type used in boring machines and include, not only a tool spindle, but the motor for driving the spindle. Mounted on the table 12 between the bridges 19 and 22, is a workholder 24. Extending upwardly from the base 11 is a stop element 25 which is adapted to be engaged by a similar stop element extending downwardly from the table 12 (see FIG. 9).

Figure 2:
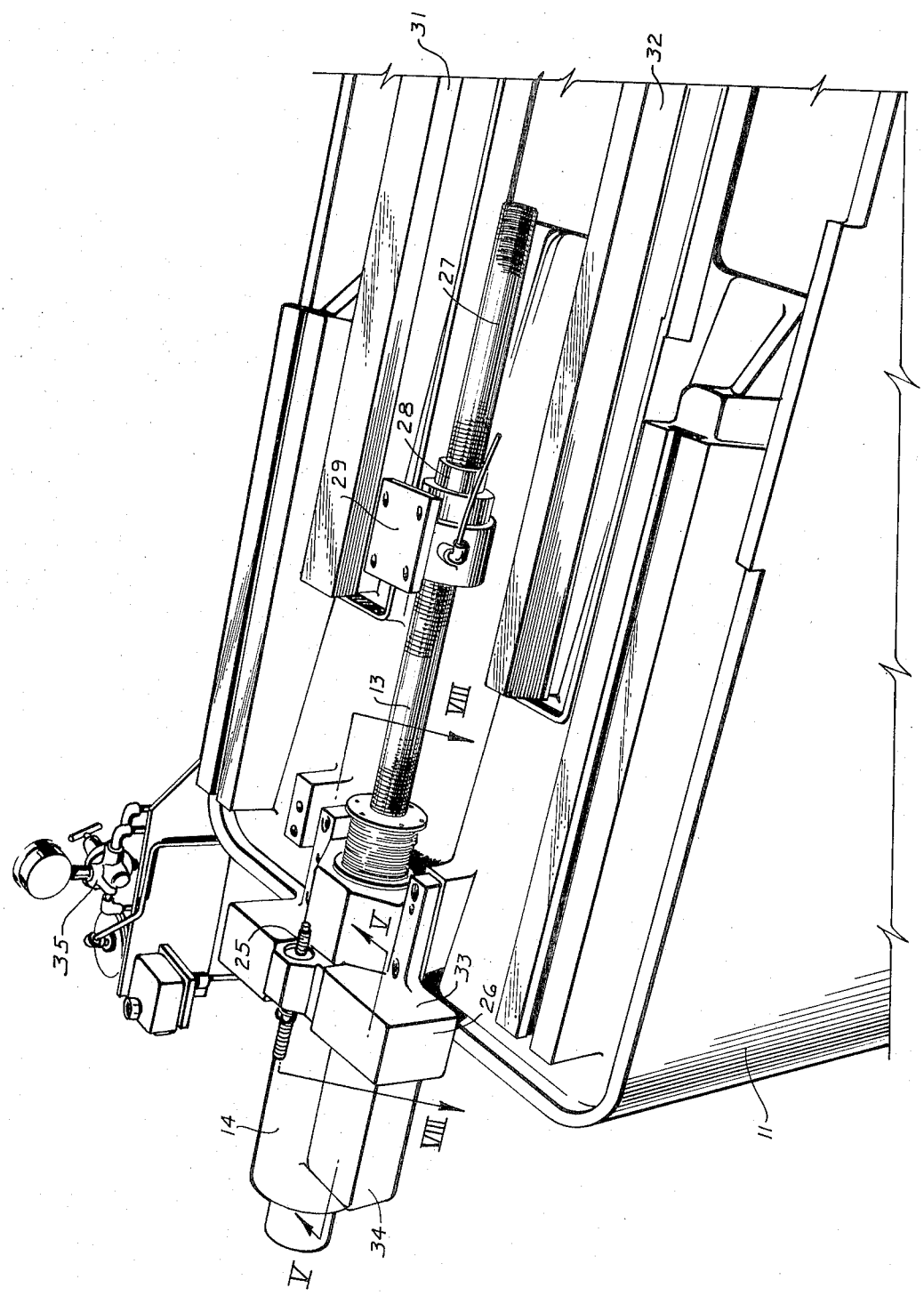
FIG. 2 is a perspective view of a portion of the machine with upper elements removed to show the details of an actuator.

Referring now to FIG. 2, it can be seen that the actuator 13 and its motor 14 are mounted in a casting 26, which in turn is bolted to the base 11 which also carries the stop element 25. The actuator 13 includes a ball-screw mechanism, including a screw 27 which is driven by the motor 14 and a nut 28 which is mounted on an abutment 29 is bolted to the underside of the table 12. Suitable ways 31 and 32 are carried by the base 11 to support and guide the table 12 in its sliding movement relative to the base. A casting 26 is formed with a box 33 adapted to carry a potentiometer-driving mechanism (which will be described in further detail hereinafter) and has attached to it a cover 34 having a box-like configuration for enveloping a primary potentiometer. Mounted at the rear of the base 11 are lubrication apparatus 35 of the usual type for supplying the various elements including the ways 31 and 32 with suitable lubrication.

Figure 3:
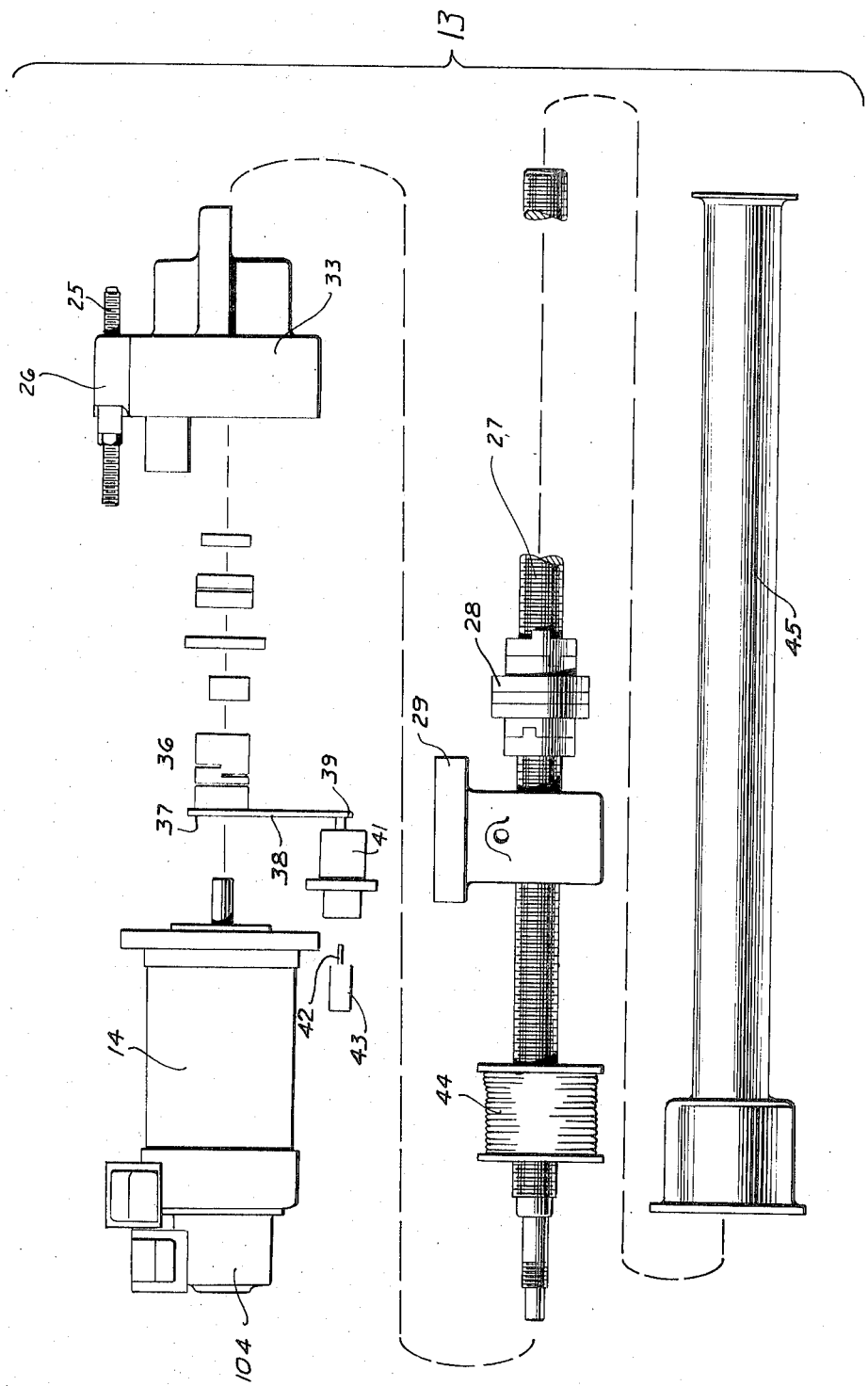
FIG. 3 is an exploded view of the actuator.

In FIG. 3 can be seen some of the details of the actuator 13. A coupling 36 is mounted on the screw 27 and drives the screw using motor 14 as motive power. It carries a sprocket gear 37 connected through a clutch by a sprocket chain 38 which drives a sprocket gear 39 mounted on a shaft of a gear reduction unit 41. The output of the unit 41 is connected through a clutch to the shaft 42 of a primary potentiometer 43. This potentiometer has its resistance element in the form of a helix. The shaft 42 is provided with a screw element which carries the actuator along the helix. It is possible with this construction to obtain an extremely long potentiometer resistance element in a small space. The bellows 44 is provided to extend between the casting 33 on one end and the abutment 29 on the other hand to protect the portion of the screw 27 extending between these elements. Furthermore, a rigid cover 45 is provided to extend from the other side of the abutment 29 to also protect the free end of the screw 27.

Figure 4:
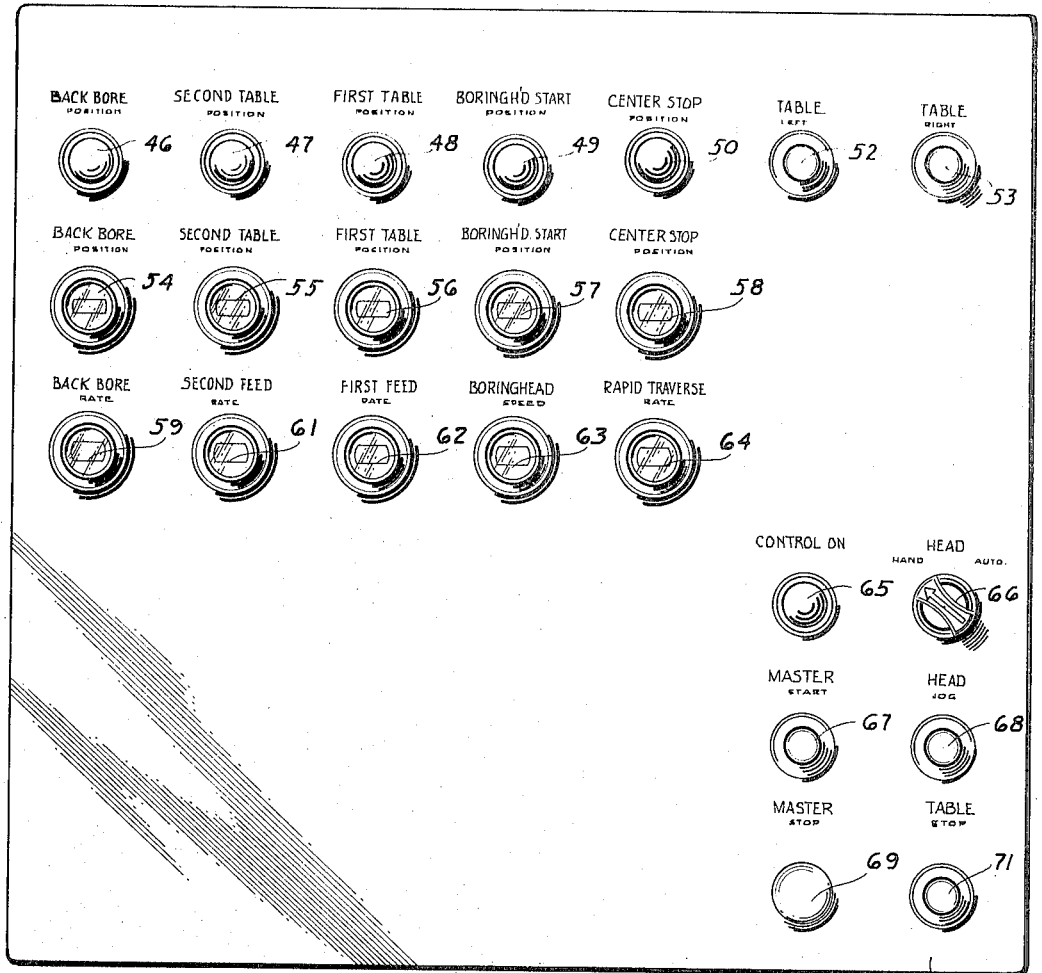
FIG. 4 is a front elevational view of a control panel.

The control panel 17, shown in FIG. 4, indicates most of the controls that are used in the operation of the machine. Along the top roware five indicator lamps which become lighted at various times. These include a BACK BORE POSITION lamp 46, a SECOND TABLE POSITION lamp 47, a FIRST TABLE POSITION lamp 48, a BORING HEAD START POSITION lamp 49 and a CENTER STOP POSITION lamp 50. In the same top row are located a TABLE LEFT manual switch 52 and a TABLE RIGHT manual switch 53. The second row includes 5 knobs which are used for setting secondary potentiometers, these include a BACK BORE POSITION knob 54, a SECOND TABLE POSITION knob 55, a FIRST TABLE POSITION knob 56, a BORING HEAD START POSITION knob 57, and a CENTER STOP POSITION knob 58. Each of these knobs is of the type which includes, not only a setable potentiometer, but the turning of the knob to set the potentiometer causes a setting of a visual readout on the face of the knob. The face of the knob thus carries a designation of the exact position of the contactor of the potentiometer in along its resistor in terms of a three-place decimal designation of the percentage of the length of the potentiometer resistor on which the contactor is positioned.

The third row contains 5 knobs for controlling speed and rate. They include a BACK BORE RATE knob 59, a SECOND FEED RATE knob 61, a FIRST FEED RATE knob 62, a BORING HEAD SPEED knob 63, and a RAPID TRAVERSE RATE knob 64. Basically, these knobs include a variable resistor which can be adjusted by the rotation of the knob and they include a visual indication on the face of the knob of the decimal portion of the resistor which is effective. At the bottom right-hand corner of the panel are located various elements, including a CONTROL ON lamp 65, a HEAD SWITCH 66, which is shiftable from a hand position to an auto position, a MASTER START switch 67, a HEAD JOG switch 68, a MASTER STOP switch 69, and a TABLE STOP switch 71.

Figure 5:
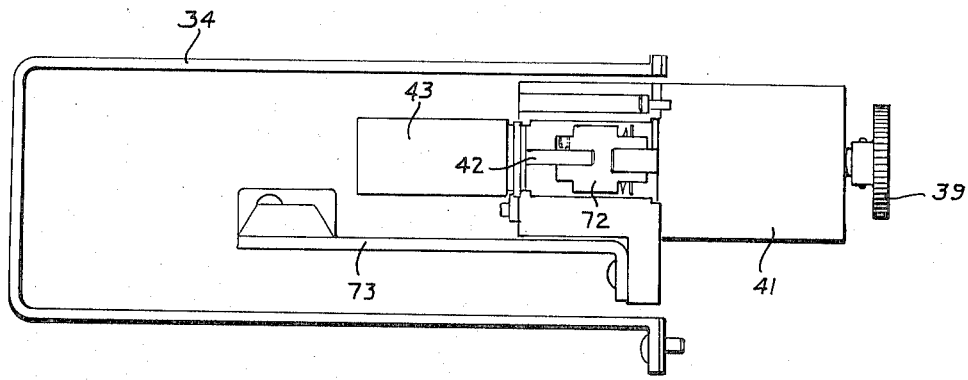
FIG. 5 is a sectional view taken on the line V—V of FIG. 2.

In FIG. 5 are shown the details of the equipment associated with the primary potentiometer 43 and the contactor shaft 42. The potentiometer is connected by a coupling 72 to the output shaft of the reduction unit 41. Within the envelope provided by the cover 34 is a support 73 which is used for making the electrical connections from the main controls to the primary potentiometer 43.

Figure 8:
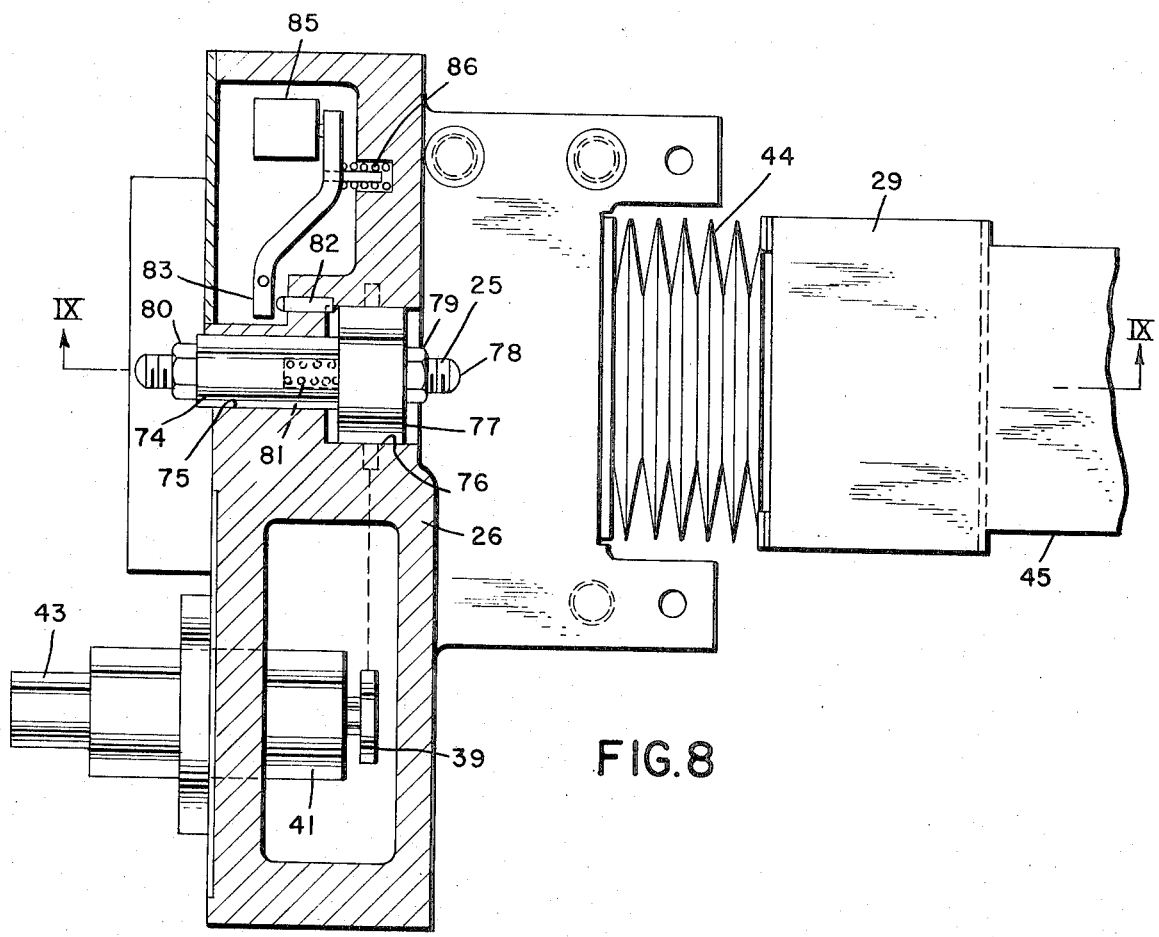
FIG. 8 is a sectional view taken on the line VIII—VIII of FIG. 2.
Figure 9:
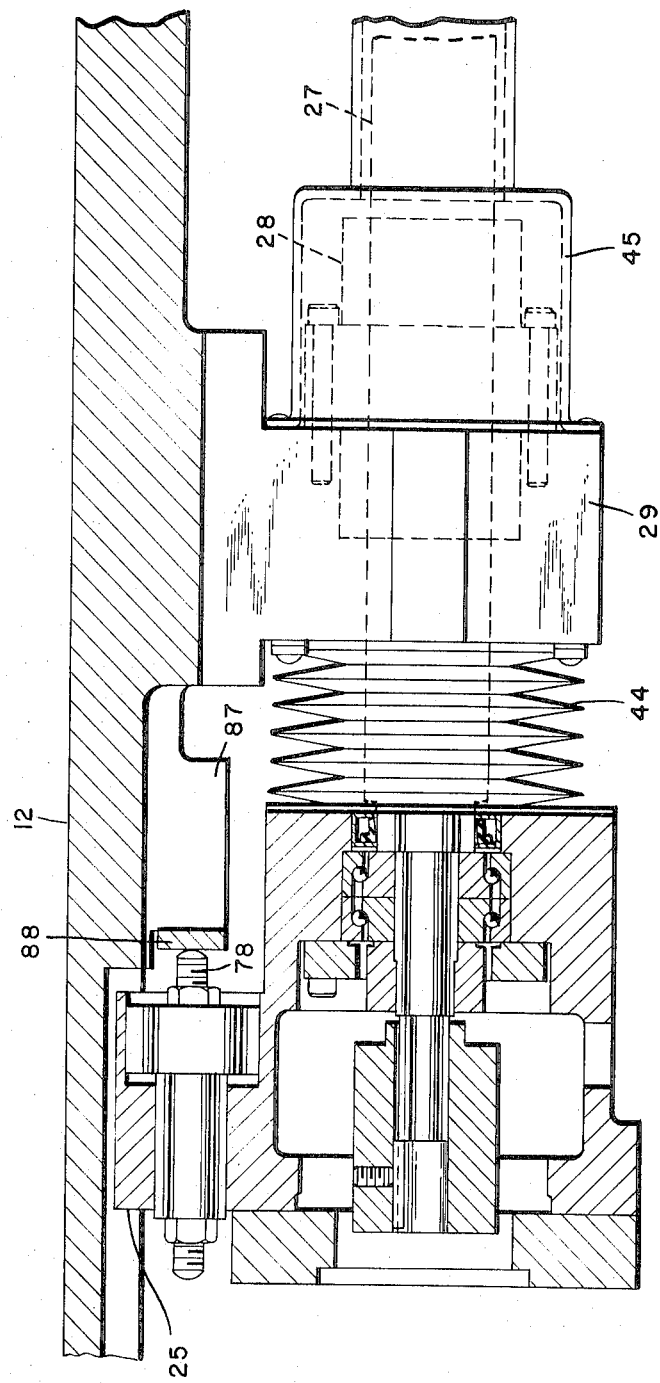
FIG. 9 is a sectional view taken on the line IX—IX of FIG. 8, FIGS. 10-16 are electrical schematic diagrams showing the electrical equipment used in the machine tool.

FIGS. 8 and 9 show the details of the manner in which the switch associated with the stop element 25 operates. It consists of a plunger 74 which is slidably carried in a bore 75 formed in the casting 26 extending upwardly from the base 11. The bore 75 is provided with a counterbore 76 in which resides an enlarged portion 77 of the plunger. A contact rod 78 extends through the plunger and is adjustably positioned relatively thereto because of the fact that it is threaded and provided with nuts 79 and 80. The coil spring 81 biases the plunger to the right in the bore 75, while the shoulder between the counterbore 76 and the main part of the bore 75, limits its motion in the other direction when brought into contact with the table 12. When it moves to the left in the counterbore 76, the enlarged portion 77 of the plunger engages a slidable pin 82, this engages one end of a lever 83 which is hindgedly mounted on a vertical pivot pin 84. The other end of the lever engages a micro-switch 85. The coil spring 86 biases the lever toward the micro-switch.

FIG. 9 shows the manner in which the table 12 engages the stop element 25. The table 12 is provided with a downwardly-depending abutment 87 having a vertical surface provided with a hardened metal button 88. The button is lined up with the rod 78 for engagement therewith.

Figure 6:
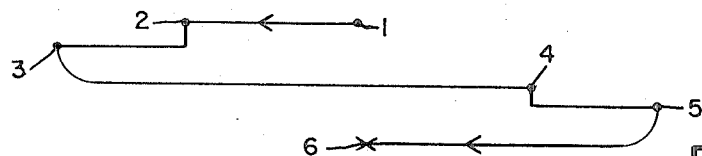
FIG. 6 is a cycle diagram showing the operation of the machine.

FIG. 6 describes, in general, the manner in which a cycle of the machine operates. At the point 1, the table 12 is in a central position with the workholder 24 located midway between the toolheads 21 and 23. The table moves to the left on a rapid traverse to the point 2. At the point 2 the workpiece is engaged by the tool and the operation proceeds from the point 2 to the point 3. At the point 3, the table is traversed to the right, passes completely through the central position and continues to the point 4 where the workpiece and the tool in the toolhead 23 are engaged. The machining operation with the toolhead 23 continues from point 4 to the point 5 at which time the table is turned to the left and stops in the central position at the point 6. Electrical apparatus that is necessary for performing this movement is shown in FIGS. 10–16, FIG. 10 shows the three phase lines 89, 90 and 91 entering the system and supplying the power to a left-hand boring-head motor $M_2$ and a right-hand boring-head motor $M_3$. These lines are also connected to suitable portions of the motor-control unit 92. This motor-control unit is a servo-drive system manufactured by Hyper-loop Inc. of Bridgeview, Ill., and designated as their HLS 1$\phi$/1W. It serves to control the torque and speed generated by the motor 14. Two of the lines 89 and 90 are connected to the primary of a transformer 93 whose secondary supplies the power lines 94 and 95 which is used with the remainder of the electrical control. Of particular interest in this portion of the electrical schematic is the left-hand brake actuating solenoid SOL 4, and the right-hand brake actuating solenoid SOL 5.

Figure 11:
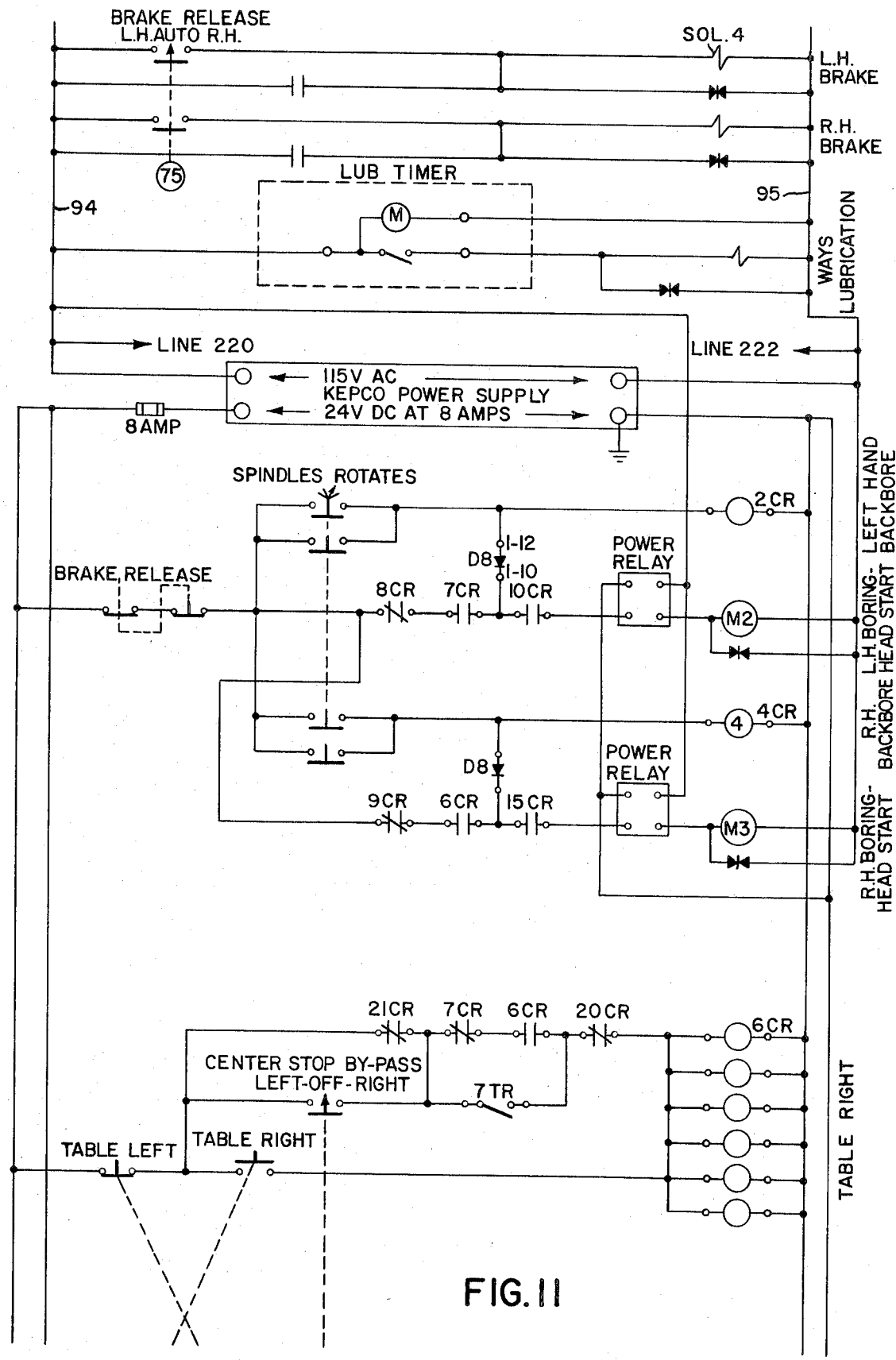

In FIG. 11, it can be seen that the 115-volt AC power lines 94 and 95 are connected to the input of a power supply 96, having a 24-volt DC output which are connected to lines 97 and 98. Of interest in this portion of the controls is the left-hand limit switch LS2 and the right-hand limit switch LS3, (since the right-hand end of the base is provided with a stop element similar to the stop element 25 and with a similar limit switch LS3).

Figure 12:
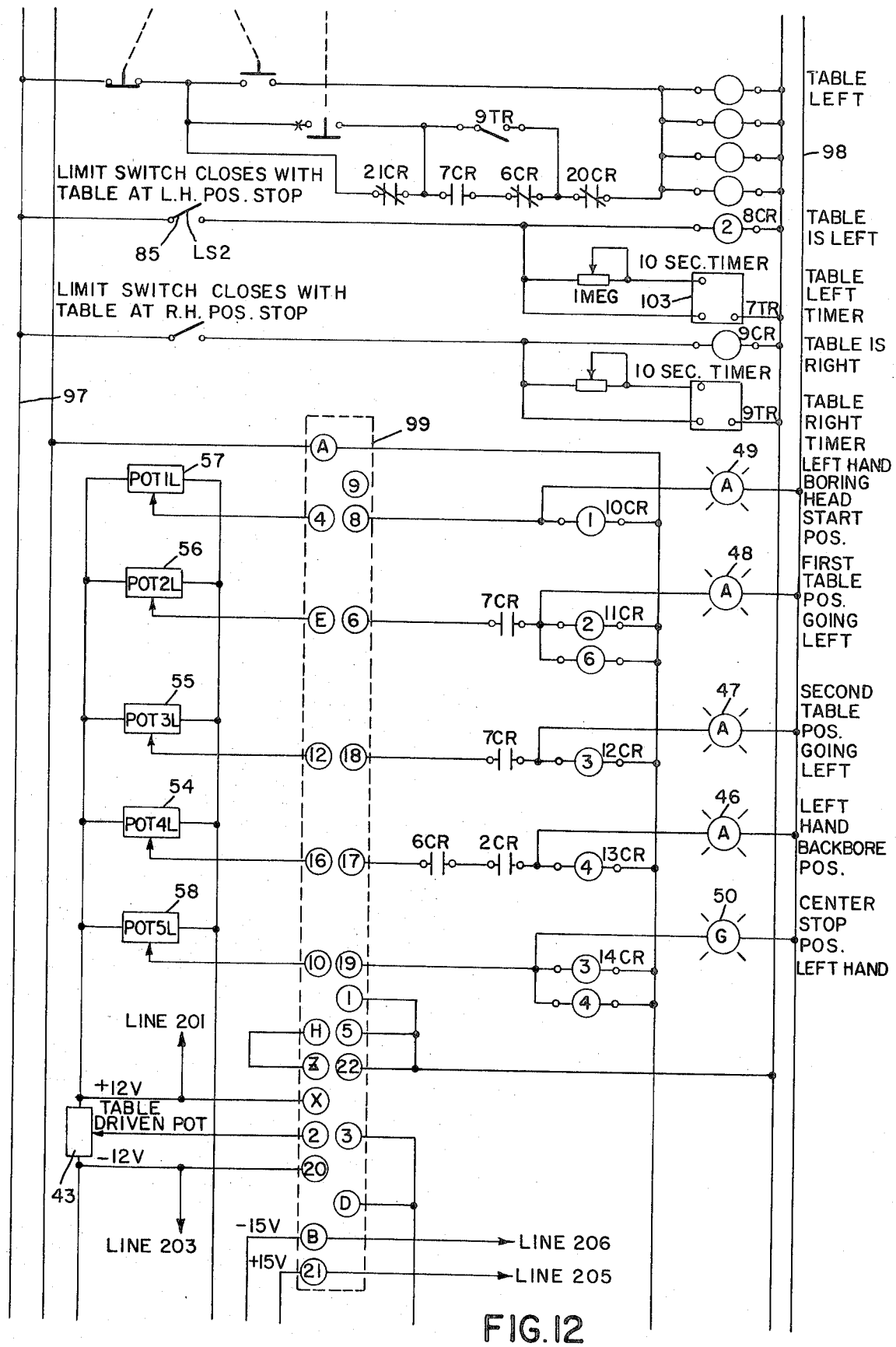
Figure 15:
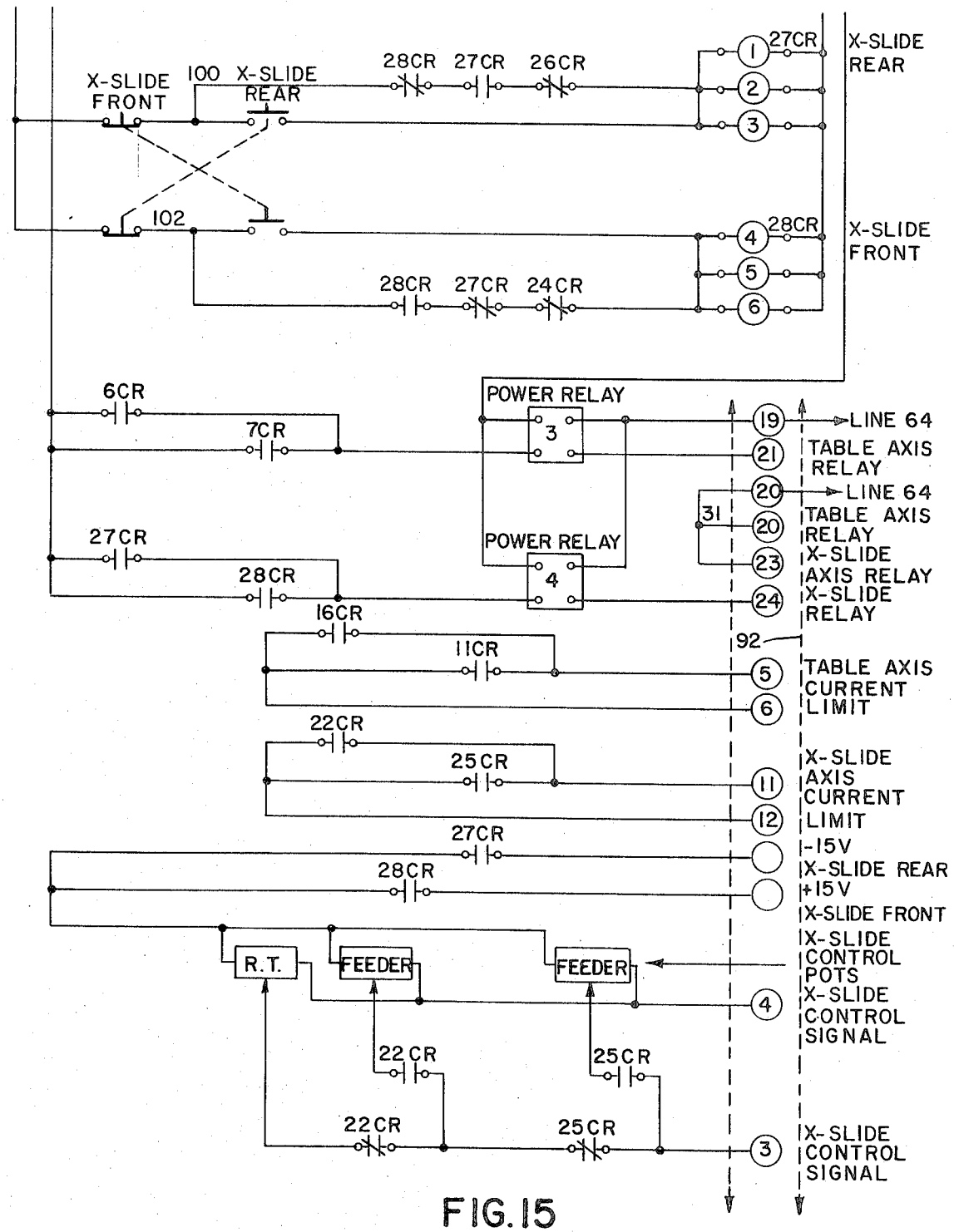
Figure 16:
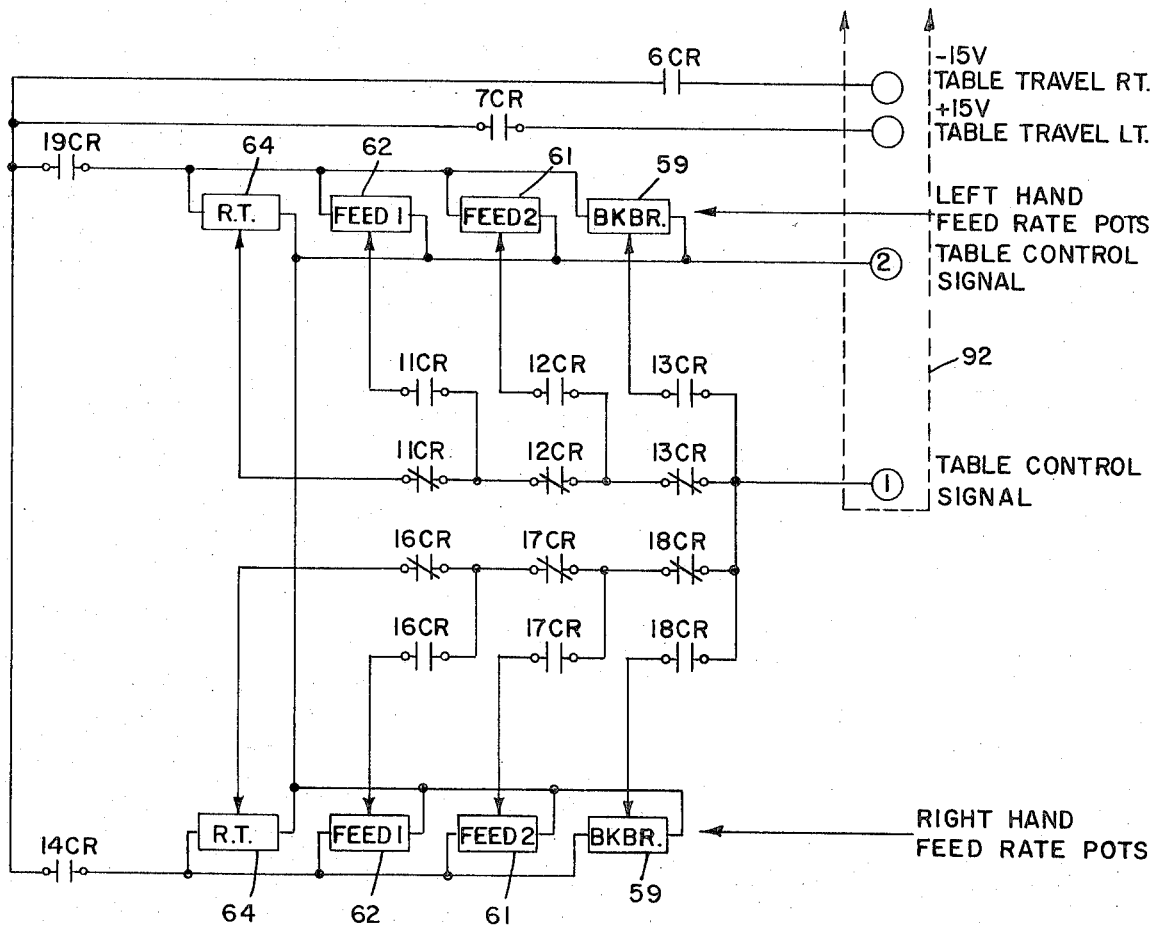
Figure 17:
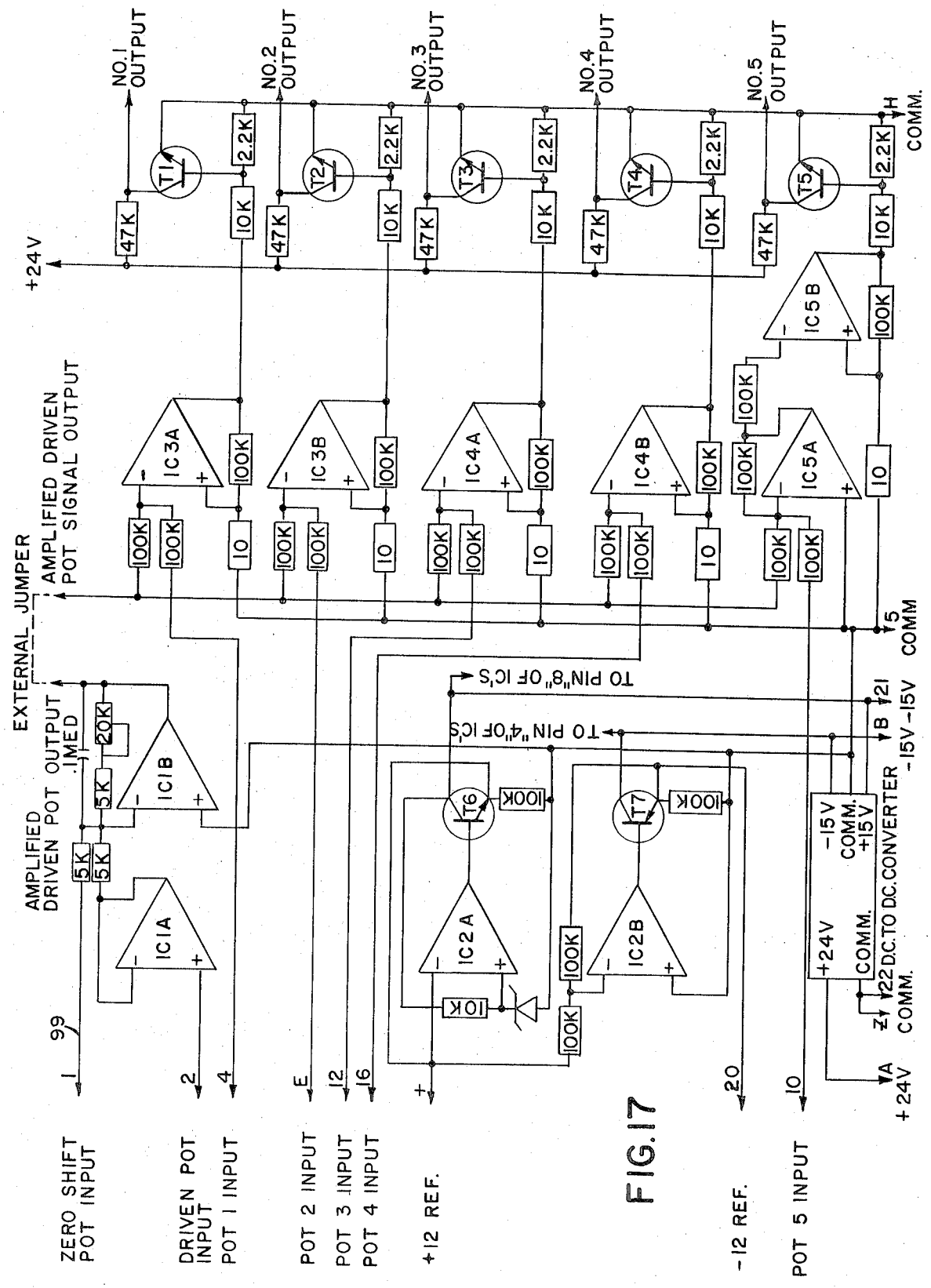
FIGS. 17 and 18 are electrical schematic diagrams of printed circuit boards used in the control of the machine tool.
Figure 18:
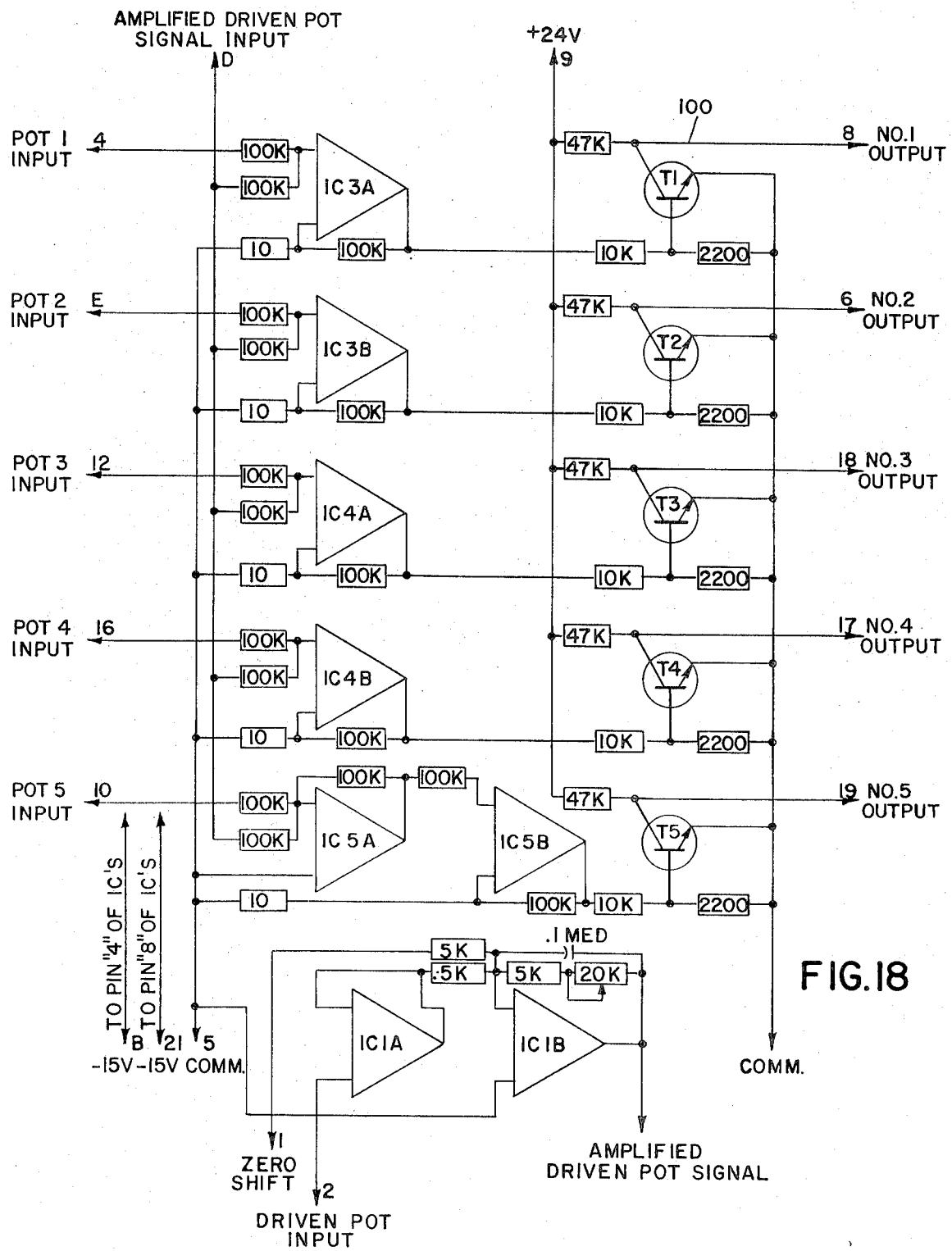

In FIG. 12, it can be seen that the elements are connected to two circuit boards 99 and 100. Circuit board 99 is shown in FIG. 15, while the circuit board 100 is shown in FIG. 16. FIG. 12 also shows the way in which the lamps 46 through 50 are incorporated into the circuitry. It also shows the way in which the potentiometer is associated with the knobs 54 through 58 are incorporated into the circuitry. The primary potentiometer 43, is also shown in the circuitry.

Figure 13:
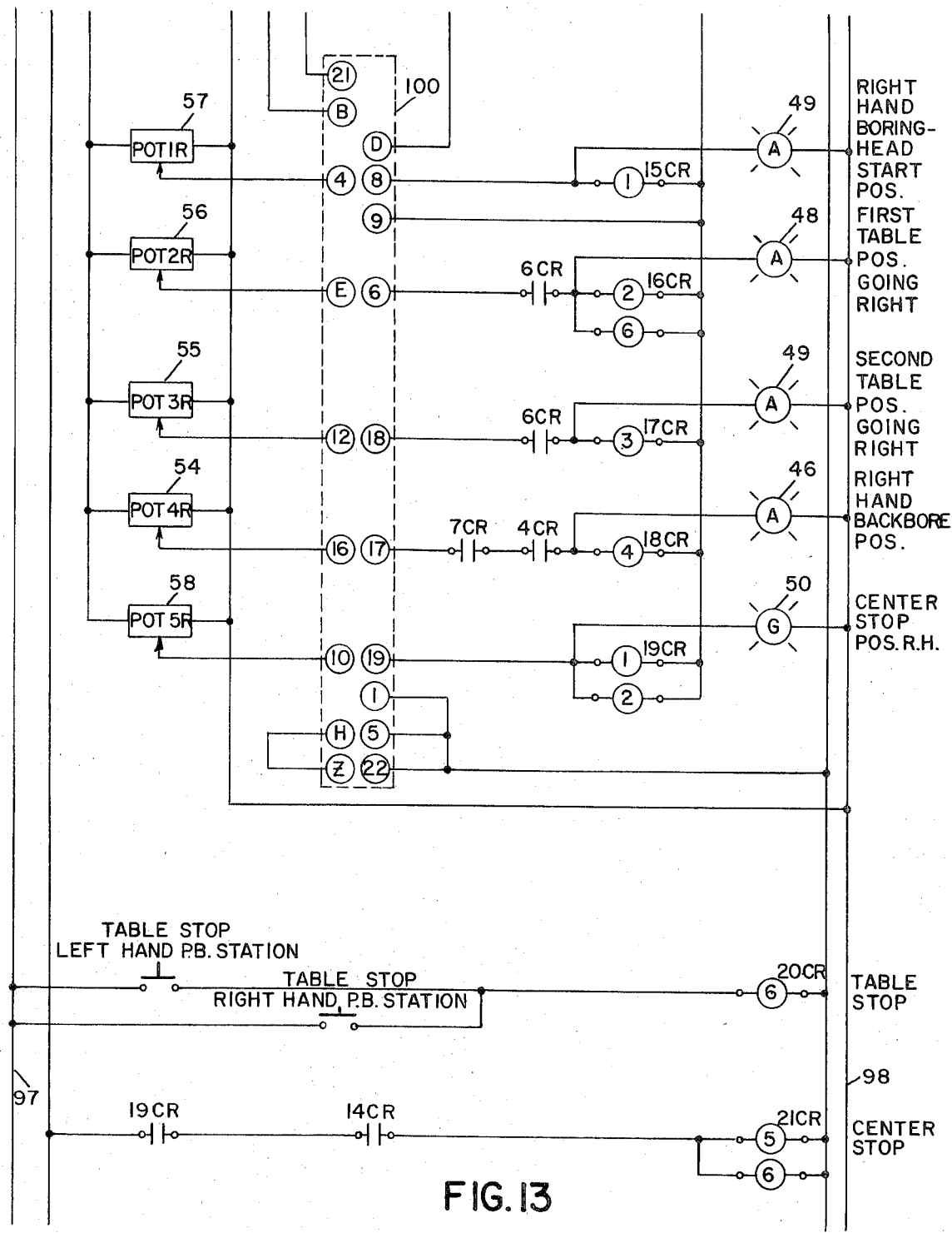

It should be noted that some of the elements in the electrical controls have to do with a cross-slide arrangement built into the workholder 24 and incorporating the same type of ball-screw drive and torque-controlled motor as is used for the main traverse. No attempt is made to describe its operation in connection with the present invention, but the circuit board 101 in FIG. 13 is associated with the control of this motion. Also, the motor control unit 92 appears in this view and is connected in a suitable manner.

Figure 14:
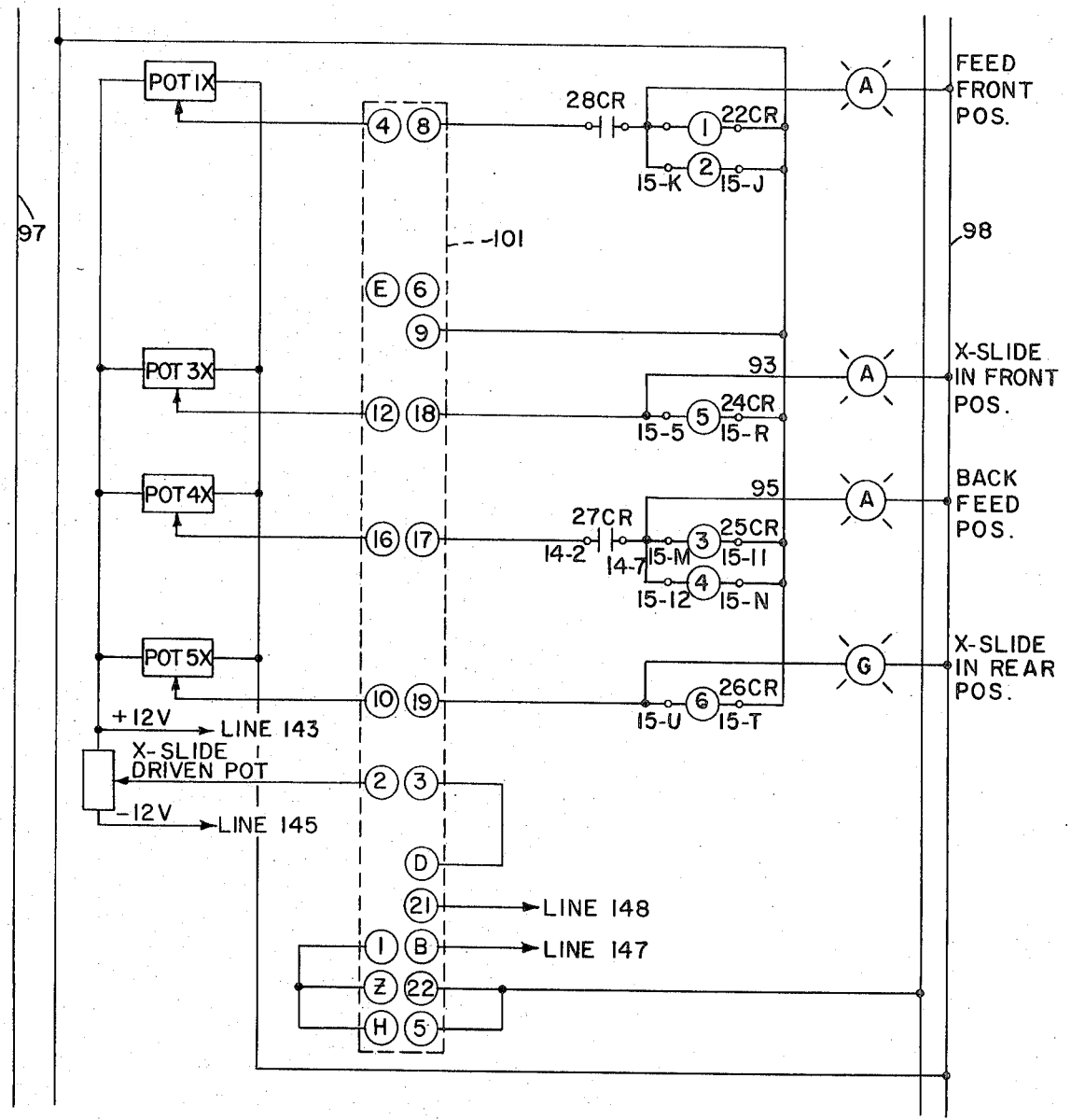

In FIG. 14, it can be seen that the elements are also connected to the motor control unit 92 and connected into the circuitry are the potentiometers associated with the knobs 59, 61, 62 and 64.

FIG. 15 shows the circuit board 99. It shows that it consists of a number of operational amplifiers associated with transistors and with a DC-to-DC convertor 102.

Similarly, FIG. 16 shows the details of the circuit board 100. The circuit board 101 is exactly the same, but, of course, connected in a different way to different parts of the circuit. Generally speaking, the board 100 consists of a number of operational amplifier units connected to transistors. The boards 99, 100 and 101 are printed circuit boards which reside in the control cabinets 15 and 16 and which, in accordance with common practice, may be readily replaced by a sliding action. They are printed circuits combined with logic circuits and transistors to give a compact rugged construction.

Figure 7:
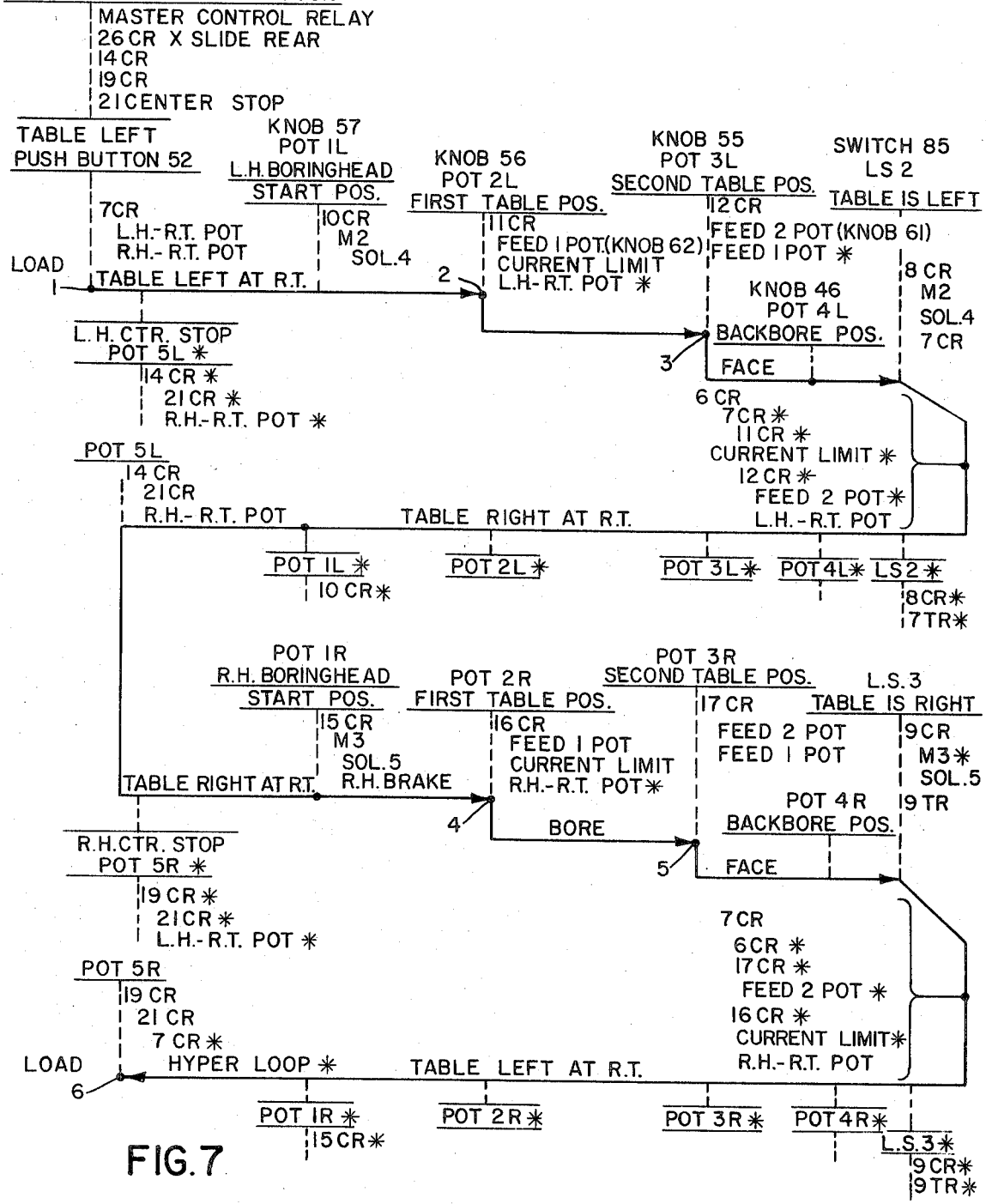
FIG. 7 is a detailed cycle diagram showing the operation of the machine and the elements which take part in the various parts of the cycle.

The operation of the apparatus will now be readily understood in view of the above description and particularly in conjunction with an examination of FIG. 7. With the motors operating in the toolheads 21 and 23 and the actuator motor 14 energized, as well as the motor control unit 92, the table is set in motion to the left by actuating the TABLE LEFT push button 52. The knob 57 determines the point at which the left-hand boring head is started. When it has started, the lamp 49 lights up. The table reaches the first position, as determined by the FIRST POSITION knob 56. The FIRST POSITION lamp 48 lights up. The boring operation starts with the boring head speed as set by the knob 63 and is fed axially at the rate determined by the knob 62. Eventually, the table reaches the point determined by the SECOND TABLE POSITION knob 55 and the SECOND TABLE POSITION lamp 47 lights up. The second boring operation starts up at a second feed rate determined by the knob 61. Incidentally, the rapid traverse rate, as the table moves from point 1 to point 2, is determined by the setting of the resistor associated with the RAPID TRAVERSE RATE knob 64, and of course, the boring head speed is determined by the knob 63. In FIG. 7, also it should be noted that, the asterisk appearing in various places indicate that the element concerned has been dropped out at that particular point.

Figure 10:
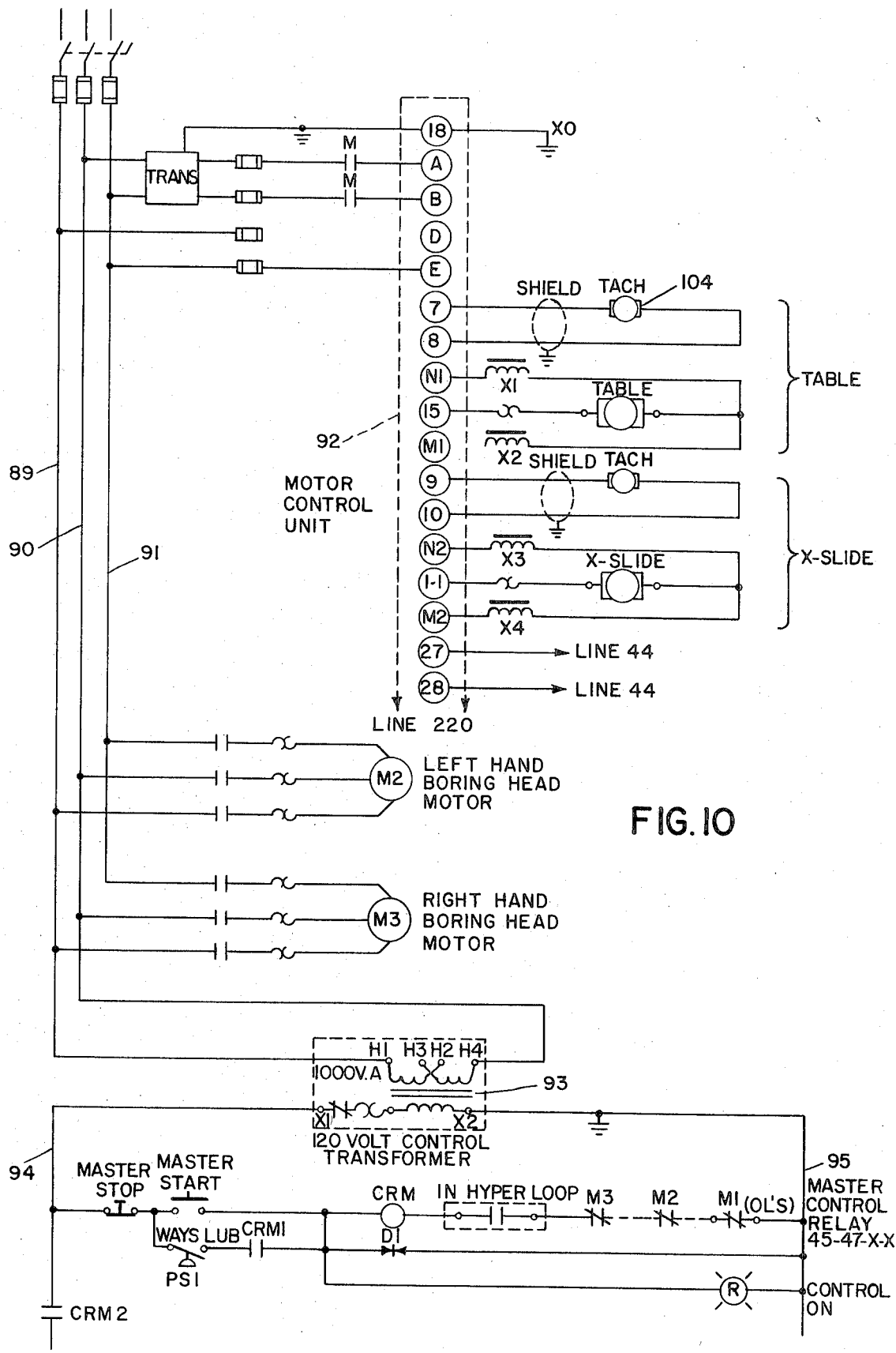

As the table approaches the left-hand side, and the button 88 on the abutment 87 of the table 12, engages the stop rod 78, the plunger 74 is pushed to the left against the spring pressure of the coil spring 81. Eventually, the shoulder between the enlarged portion 77 and the rest of the plunger 74, engages the end of the pin 82 and the pin, in turn, pushes the lever 83 rotating it in a clockwise direction (as viewed in FIG. 8). This clockwise direction is contrary to the spring bias introduced to it by the spring 86 and serves to actuate the spring 85. As a matter of fact, it closes the microswitch 85, which starts a timer; after the preselected time has passed, the timer acts to reverse the motion of the table by reversing the direction of rotation of the motor. The motor-control unit 92 has been actuated by the FIRST TABLE POSITION potentiometer 48 in such a way that the torque in the motor 14 is limited. This means that the motor operating through the screw 27 and the nut 28 produces a force by which the table 12 engages the stop element 25 and pushes against it. A plunger 74 has been pushed to the left (in FIG. 8) in amounts sufficient for the shoulder on the enlarged portion 77 to engage the bottom of the counterbore 76 so that it can go no further and so that further action operates through the casting 26 into the base 11. In other words, the table 12 pushes against a stop on the base 11 with a force determined by the limited torque in the motor 14. It remains in this position for a time as determined by the time 103 in FIG. 11. This means that the boring tool operates to clean up a shoulder for a length of time determined by the timer and this particular shoulder is cleaned up while the table is pressed to the left against a stop with a predetermined force. This gives exact repeatability of the position of the finished surface thus produced. It should be noted that a tachometer 104 is attached to the outboard end of the motor 14 as indicated in FIGS. 3 and 10.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A machine tool, comprising
 a. a base,
 b. a table mounted for sliding movement on the base,
 c. an actuator operative between the base and the table, the torque and speed of the actuator being controllable,
 d. a primary potentiometer connected to the actuator, e. a plurality of secondary potentiometers set at selected values,
f. a control for comparing signals from the secondary potentiometers with a signal from the primary potentiometers, and
g. a stop element on the base engaging a stop element on the table at a point in the sliding movement, and
h. means causing the torque generated by the actuator to remain at a pre-selected value during engagement between the stop elements.

2. A machine tool as recited in claim 1, wherein the actuator is a ball-screw mechanism rotated by a torque-controlled motor.

3. A machine tool as recited in claim 1, wherein the primary potentiometer includes a helical resistance element and a contactor driven by the actuator.

4. A machine tool as recited in claim 1, wherein the secondary potentiometers are individually adjustable to give voltage settings corresponding to various locations in the sliding movement between the table and the base.

5. A machine tool as recited in claim 1, wherein one of the stop elements has a switch mounted for actuation by the other stop element, and wherein the switch is located so that it is actuated slightly before positive engagement takes place between the stop elements.

6. A machine tool as recited in claim 1, wherein a digital display mounted on the base gives a continuous indication of the condition of the primary potentiometer and, therefore, of the position of the table relative to the base.

7. A machine tool as recited in claim 6, wherein the secondary potentiometers are individually adjustable and each carries a display which is indicative of the value of the setting at all times.

8. A machine tool as recited in claim 7, wherein a coincidence of the value of the primary potentiometer with the setting on a secondary potentiometer serves to set in motion a change of mode of operation of the actuator.

* * * * *